April 7, 1931. P. C. McKENDRICK Re. 18,031

RELAY FOR HIGH TENSION FUSES

Original Filed May 25, 1925 2 Sheets-Sheet 1

Inventor
PAUL C. McKENDRICK

By Paul, Paul & Moore
ATTORNEYS

April 7, 1931. P. C. McKENDRICK Re. 18,031

RELAY FOR HIGH TENSION FUSES

Original Filed May 25, 1925 2 Sheets-Sheet 2

Inventor
PAUL C. McKENDRICK

By Paul, Paul & Moore
ATTORNEYS

Reissued Apr. 7, 1931 Re. 18,031

UNITED STATES PATENT OFFICE

PAUL C. McKENDRICK, OF ST. PAUL, MINNESOTA, ASSIGNOR, BY DIRECT AND MESNE ASSIGNMENTS, TO FUSALINE, INC., OF MINNEAPOLIS, MINNESOTA, A CORPORATION OF DELAWARE

RELAY FOR HIGH-TENSION FUSES

Original No. 1,660,080, dated February 21, 1928, Serial No. 32,552, filed May 25, 1925. Application for reissue filed September 9, 1929. Serial No. 391,447.

The present invention relates to a fuse relay mechanism.

When a fuse blows in an electrical power line, it is usually caused by either a momentary overload of the circuit or by a short circuit therein. In the case of an overload, this is usually removed by an operator as soon as the power fails, and in the case of a short circuit, especially in high-power supply lines, the short circuit will usually burn through or melt the object which caused the short circuit and thereby clear the line. If a second fuse is inserted after a time interval, the circuit will be again in a condition for operation.

Fuses are frequently placed at comparatively great distances from the source of power, and from a service station and where it is necessary to replace blown fuses by hand it frequently entails a long and unnecessary delay and considerable expense.

An object of the present invention is to mechanically replace a blown fuse in a circuit with a fresh fuse after a predetermined time interval.

Another object is to hold a trip means in an inoperative condition by means of a fuse wire, and to release the trip means upon the breaking of the fuse wire to operate a time mechanism which will replace the fuse, after a predetermined time interval, with a fresh fuse.

These and other objects of the invention, not specifically mentioned, will be more fully brought out in the following description and the accompanying drawings, wherein.

Figure 3:
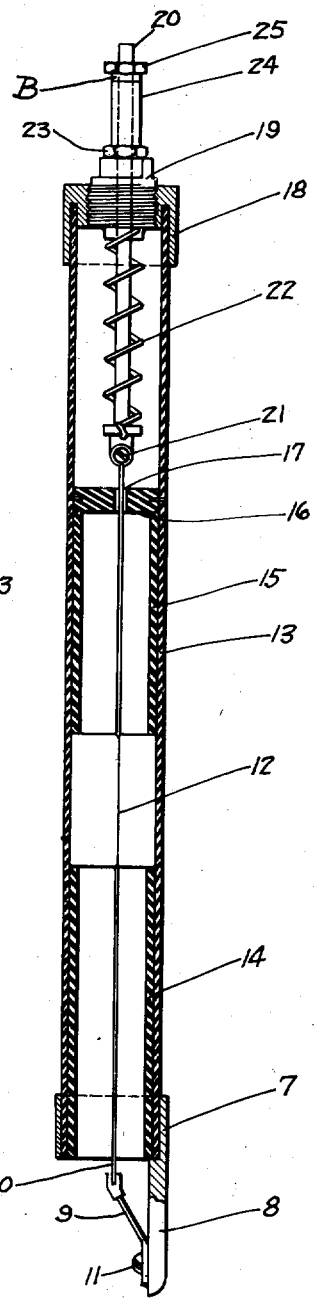
Figure 3 is a view in vertical section through a fuse shown in Figure 1.

Referring to the drawings in detail, a mounting plate 1 may be of suitable insulating material, and upon this plate a pair of box-like housings 2 and 3 are constructed of a suitable insulative material to house a pair of fuses to be later described in detail. A small platform 4 of insulative material is mounted on supports 5 and is affixed to the mounting plate 1 in a suitable manner, as by screws, not shown. A fuse A, preferably having a structure such as that specifically illustrated in Figure 3, is mounted within the housing 2 by means of a pair of spring contact clips 6 of a well known type. The body of the fuse comprises a tube 13 of suitable insulative material. A conductive ring 7, which may be of bronze, encircles the lower end of fuse A, and has extending from the lower end thereof a projection 8 to which a lower terminal member 9 of a fusible element 10 may be connected by means of a screw 11 which threadedly engages the projection 8. The fusible element is preferably thinned at 12 to fuse at this point when subjected to a predetermined excess of current over that which it is designed to normally carry.

Having a tight, slidable fit within the tubular member 13 of the fuse are a pair of insulated bushings 14 and 15, which are intended to reduce the diameter of the interior of tubular member 13 and provide an explosion chamber of enlarged diameter intermediate the ends of the tubular bushings.

An insulating partition 16, having a central opening 17 therethrough, is affixed transversely of the tubular member 13 to be closely adjacent the upper end of upper bushing 15. An annular metal contact member 18, having a threaded central opening, is affixed to the upper end of the tubular member 13 to be gripped by clips 6. A threaded member 19, having a hole drilled centrally longitudinally thereof, threadedly engages the threaded opening in annular contact member 18. A plunger rod 20 is slidably mounted within the central longitudinal opening of annular contact member 19 to slide freely therein, and is provided with a screw 21 at its lower end by means of which the upper end of the fusible element 10 may be connected to the plunger rod. A coil spring 22, having its upper end permanently connected to the threaded member 19, has the lower end thereof secured to plunger rod 20, and is held in tension intermediate the threaded member and the plunger rod when a fuse element 10 is connected to the plunger rod by means of the screw 21. The upper portion of the plunger rod is threaded, and a nut 23 is threadedly mounted thereon. A tubular sleeve 24, which may be of insulative material, is mounted upon the plunger rod to rest upon the nut 23 and a trip member B rests upon the insulative sleeve 24, as shown. A second nut 25 threadedly engaging the plunger rod holds the sleeve and trip members firmly in compression between the two nuts to retain the parts in position.

The trip member B comprises a strip of metal bent at 26 to form a right angle, and at 27 to form a second right angle. The central vertical portion is slidably mounted upon a plate 28 by means of a pair of guides, the plate 28 being integrally secured to the side of the fuse housing 2. The trip mechanism is shown in solid lines in a set condition and in dotted lines in an actuated condition.

Figure 1:
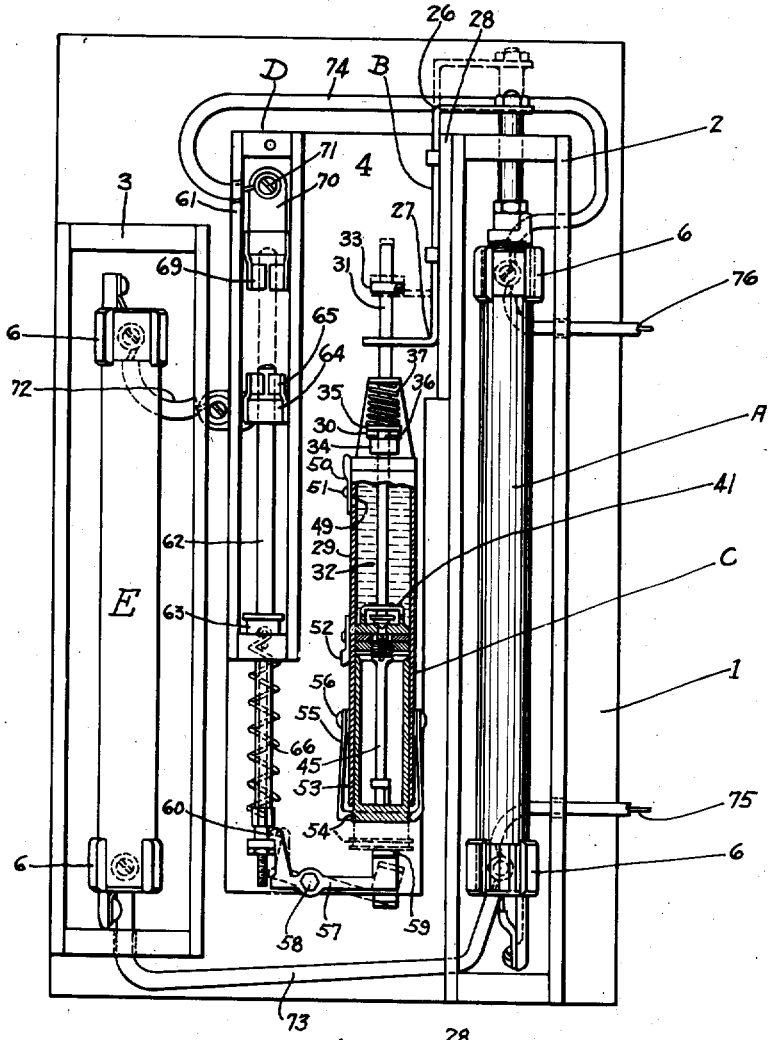
Figure 1 is a view in top elevation of a device made in accordance with the present invention, a part thereof being broken away to show the operative structure of the device.

The plunger rod 20 is normally held in a lowered or set position by means of the fusible element 10, the parts having the positions shown in solid lines in Figure 1, and are released to assume the dotted line position shown in Figure 1, upon the breaking of fusible member 10 by the action of the spring 22.

A timing mechanism C is mounted upon the base 1 by means of clips, not shown, of a well known type. A cylindrical chamber 29 is provided with a metal extension 30 affixed to the top thereof, as by welding, the upper end of the extension being bent inwardly to extend transversely of the central axis of the tubular chamber 29. A hole is drilled in the inwardly extending portion of member 30 of a size to receive the stem 31 of a metal valve 32. A sleeve 33 is adjustably connected to the valve stem 31 by means of a screw, to permit the sleeve to be adjusted longitudinally of the valve stem. The valve stem enters the interior of the tubular chamber 29 through a packing nut 34 of a well known type, so as to make a liquid tight joint intermediate the stem and the valve.

A washer 35 is mounted upon the valve stem and a pin 36 is inserted in a hole drilled transversely of the valve stem to prevent downward movement of the washer on the stem. A spring 37 is held in compression between the washer and the transverse extension of member 30 to normally hold the valve stem in a lowered condition. The downward force of the spring 37 is considerably less than that exerted by spring 22 when released by a fusion of the fusible element 10, so that the force of the spring 22 upon an actuation thereof will be sufficient to raise the valve stem against the tension of the spring 37 and hold it in such raised position. The lower end 39 of the valve is of conical shape to form a needle valve of a well known type, and seats in an opening 38 in a bulkhead 40 affixed transversely of the tubular chamber 29. A bridged support 41 is provided with a central opening therein of a size to slidably receive the valve stem, but of smaller diameter than an annular ridge 42, which encircles the valve, to prevent the withdrawal of the needle valve from the opening in the bridged support. An enlarged opening 43 is drilled in the lower portion of the bulkhead and is threaded to receive the threaded upper end of a fluid regulating member 44. The member 44 is provided with an elongated stem 45 having a flattened lower end which permits the member 44 to be readily manipulated manually. The upper end of member 44 is drilled and tapped to receive a small regulating plug 46 threadedly inserted into the hole in the upper end of the member 44. A hole 47 is drilled in the small plug to permit the passage of liquid therethrough, and by using plugs with different sizes of apertures the rate of flow of a liquid therethrough may be regulated. A slot 48 is cut transversely of the small plug to permit the manipulation thereof with a screw driver.

A hole 49 is drilled in the side of the tubular chamber 29 and is covered by a small cap 50 pivotally mounted on a screw 51 threadedly inserted in the side of the tubular chamber, and having a sealed condition when the cap 50 is moved to cover the hole 49 in the wall of the tube, and an open condition when the member 50 is pivoted about the screw to uncover the hole 49. A second valve mechanism 52 of similar structure is mounted over a second hole in the tube wall.

A cup 53 of a size to telescope freely within the tubular chamber is inserted in the lower end thereof and is provided with a flanged annular ring 54 encircling the lower end thereof to receive a pair of spring clamps 55 affixed to the wall of the tubular chamber by means of screws 56.

Figure 2:
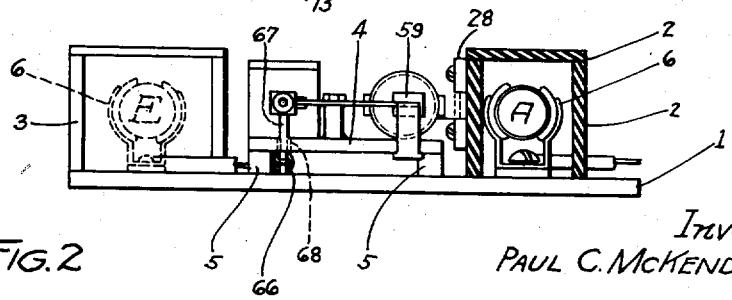
Figure 2 is an end elevation of the device shown in Figure 1, the end of a fuse housing being broken away to show a method of mounting a fuse therein.
Figure 8:
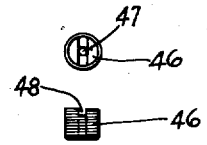
Figure 8 is a view in side and top elevation, respectively, of a small, flow regulating plug insertable in the top of the device shown in Figures 5 to 7, inclusive.
Figure 7:
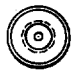
Figure 7 is a view in top elevation of the device shown in Figure 5.
Figure 6:
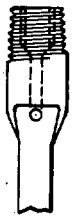
Figure 6 is a view of the same structure as shown in Figure 5, rotated through an angle of ninety degrees.
Figure 5:
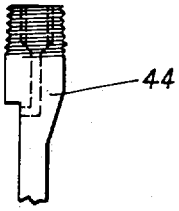
Figure 5 is a view in side elevation of a fluid release member.
Figure 4:
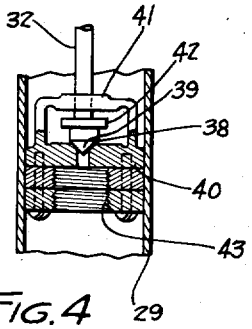
Figure 4 is an enlarged view of a liquid-releasing mechanism.

A trigger mechanism 57 is pivotally mounted upon a stud 58 affixed to the platform and is provided with an offset end portion 59 in the path of the cup 53 when the cup is released, in a manner to be described later, to drop vertically downward, and is provided with a hook 60 to engage a circuit closing device D to normally hold it in an inoperative condition. The circuit closer is mounted in a box-like housing 61 of insulative material and comprises a rod 62, which may be of bronze, slidably mounted in an insulative bushing 63 affixed in the end of the housing 61. A conductive bushing 64 having a pair of spring contact members 65 is mounted to slidably embrace the rod 62. A coil spring 66 is mounted beneath the platform, the upper end of spring 66 being connected to the platform, and the lower end thereof being connected to an arm 67 (see Figure 2), depending from the rod 62, to a point below the platform. The depending arm 67 rides in a slot 68 cut longitudinally of the platform. A second pair of spring contact members 69 are positioned in vertically spaced relation from the lower clips 65 and are mounted upon a stop member 70 of conductive material held in position in the housing 61 by means of a screw 71.

The lower spring contact members are electrically connected to the upper end of a fuse E, of a well known type, by means of a conductor 72. The fuse E is mounted in a well known manner in the box-like housing 3. The lower end of the fuse E is electrically connected to the lower spring clips 6 in housing 2 by a conductor 73. An electrical conductor 74 also connects the support 70 upon which upper contact members are mounted to the upper end of fuse A. Electrical conductors 75 and 76 are connected into a circuit with which the device is to be utilized in a well known manner.

The operation of the device is as follows:

A fuse A is inserted in the clips 6 to maintain the trip mechanism B in the inoperative solid line position shown in Figure 1. This permits the spring 37 to force the valve 32 downward to seat the valve in the central opening of the bulkhead 40. A quantity of mercury is then poured into the portion of the tubular chamber above the bulkhead. The circuit closing rod 62 is manually drawn downward and engaged by the hook 60. Cup 53 is held in the solid line position shown in Figure 1 by means of the spring clips 55, and a second fuse E is placed in position in the housing 3. The fuse E is held out of the circuit by the gap intermediate the upper spring clips 69 and the end of rod 62.

When the circuit in which fuse A is inserted becomes overloaded to a point which causes a fusion of the fusible element 10, the spring 22 raises the plunger 20 and moves the trip mechanism to the dotted line position shown in Figure 1. This raises the valve from its seat in the bulkhead and permits the passage of the mercury contained therein from the upper compartment to the cup 53. The tension of the spring clips is adjusted to release the cup when a predetermined weight of mercury is contained therein. The rate of passage of the mercury from the upper into the lower compartment may be regulated by the size of the opening in the small plug 46 inserted in the top of member 44. When a predetermined weight of mercury is contained in the cup, the force of gravity thereon overcomes the sustaining power of the spring clips 55 and the cup drops, thereby moving the release lever 57 about its pivot and causing the hook 60 to release the circuit closing plunger 62. The circuit closing plunger is thrown upward by the force of the coil spring 66 and engages upper spring contacts 69 to close the circuit and thereby place the fuse E in the circuit.

If desired, a second fuse similar to fuse A may be used instead of an ordinary fuse E illustrated, and a second timing mechanism similar to that illustrated and described may be used in connection with such fuse to cut in a third fuse, not shown, in the same manner as fuse E described and illustrated, is cut in. The number of fuses to be used is entirely optional with the user.

While a timing mechanism such as that described and illustrated is suitable for the purpose specified, it is not desired to limit the construction to such a timing mechanism but to include any timing mechanism of a well known type in the combination.

What I claim is:

1. A device of the character described, comprising a fusible element, movable means having a normal condition and an actuated condition and adapted to be held in normal condition by the fusible element and released for actuation when said fusible element breaks, fluid controlled timing means with which said movable means is operatively associated, and circuit-controlling means adapted to be released for actuation at a time after release of said movable means predetermined by said timing means.

2. A device of the character described, comprising a fusible element, movable means having a normal condition and an actuated condition and adapted to be held in normal condition by the fusible element and released for actuation when said fusible element breaks, timing means, including a fluid containing chamber, with which said movable means is operatively associated, circuit-controlling means, resilient means for moving said circuit-controlling means to closed condition, and means for holding said circuit-controlling means in open condition against the action of said resilient means, said last mentioned means being adapted to be actuated at a time after release of said movable means predetermined by said timing means to allow said resilient means to move the circuit-controlling means to closed condition.

3. A device of the character described, comprising a fusible element, movable means having a normal condition and an actuated condition and adapted to be held in normal condition by the fusible element and released for actuation when said fusible element breaks, a fluid controlled timing device with which said movable means is operatively associated, and circuit-controlling means adapted to be released for actuation by cooperative action of said movable means and said timing device at a predetermined time after release of said movable means.

4. A device of the character described, comprising a fusible element, movable means having a normal condition and an actuated condition and adapted to be held in normal condition by the fusible element and released for actuation when said fusible element breaks, timing means with which the movable means is operatively associated, trigger means having a set condition and a released condition adapted to be released at a time after release of said movable means predetermined by said timing means, circuit-controlling means operatively associated with the trigger means to be normally held in one of its operated conditions thereby, and resilient means to move the circuit-controlling means to another of its operated conditions upon release by said trigger means of said circuit-controlling means.

5. A device of the character described, comprising a fusible element, movable means having a normal condition and an actuated condition and adapted to be held in normal condition by the fusible element and released for actuation when said fusible element breaks, a timing device with which the movable means is operatively associated, trigger means having a set condition and a released condition adapted to be released by cooperative action of said movable means and said timing device at a predetermined time after release of said movable means, circuit closing means operatively associated with the trigger means to be normally held in an open condition thereby, resilient means to move the circuit closing means to a closed condition upon the release by said trigger means of said circuit closing means, and a second fusible element normally electrically disconnected from the first fusible element to be connected in parallel with the first fusible element upon the actuation of the circuit closing means.

6. A device of the character described, comprising a fusible element, trip means having a set condition and an operated condition, resilient means operatively connected to the fusible element and to the trip means to cause an actuation of the trip means upon a breaking of the fusible element, a timing mechanism operatively connected to the trip means, switch means operatively associated with the timing element to be operated by the timing element, a predetermined interval after the actuation thereof, and a second fusible element to be normally electrically disconnected from the first fusible element and to be electrically connected in parallel therewith upon an actuation of the switch means.

7. A device of the character described, comprising a housing, a fusible element removably mounted therein, a movable member connected to the fusible element, resilient means held in compression by the movable member when connected to the fusible element, timing mechanism operatively associated with the movable member to have a normal condition and a released condition, and mechanically actuated circuit-closing means operatively associated with the timing mechanism to be normally held in open condition and to be moved to a closed condition upon a release of the timing mechanism.

8. A device of the character described, comprising a fusible element, movable means connected to the fusible element and having a normal condition and an actuated condition to be held in a normal condition by the fusible element and to be actuated upon a breaking of the fusible element, valve means operatively connected to the movable member to be held in a closed condition when the movable member is in a normal condition, and to be moved to an open condition upon an actuation of the movable member, a fluid chamber having the valve operatively mounted therein, a quantity of liquid in said chamber, a cup mounted below the valve means to receive liquid discharged by said valve means from the fluid chamber upon an actuation of the valve means, retaining means to normally retain the cup in a raised condition and to release the cup for downward movement when a predetermined weight of liquid is contained in said cup, trigger means mounted in the path of the cup when released for downward movement to be actuated by a downward movement of said cup, circuit closing means normally held in an open condition by said trigger means to be released thereby upon an actuation of said trigger means by the cup, and a secondary fusible element to be connected by the circuit closer in parallelism with the first fusible element upon an actuation of the circuit closing means.

9. A device of the character described, comprising a fusible element, movable means having a normal condition and an actuated condition, to be held in a normal condition by the fusible element, timing means operatively associated with the movable element, trigger means having a set condition and a released condition to be released by said timing mechanism a predetermined time after the actuation of the timing mechanism, circuit closing means operatively associated with the trigger means to be normally held in an open condition thereby, resilient means to move the circuit closing means to a closed condition upon the release by said trigger of said circuit closing means, and a secondary fusible element normally electrically disconnected from the first fusible element to be connected in parallel with the first fusible element upon the actuation of the circuit closing means.

10. A device of the character described, comprising a fusible element, a normally unoperated timing mechanism operatively associated with the fusible element to be operated upon the fusing of said fusible element, a movable portion of said timing mechanism being actuated upon the completion of a predetermined time interval, mechanically actuated circuit closing means having a releasing element therein operatively associated with the timing mechanism to normally hold said circuit closing means in an open condition and to be actuated by the movable portion of the timing mechanism upon an actuation thereof to release said circuit closing means for closing.

11. A device of the character described, comprising a fusible element, trip means associated therewith to be held in a normal condition thereby, timing means mounted adjacent said trip means to be operated by a release of said trip means, a movable portion of said timing means being actuated upon the completion of a predetermined time interval, mechanically actuated circuit closing means, means associated with said mechanically actuated circuit closing means to urge said circuit closing means to a closed condition, and trigger means normally holding said circuit closing means in an open condition and being moved by an actuation of the movable portion of said timing mechanism to release said circuit closing means for closing.

In witness whereof, I have hereunto set my hand this 30 day of August, 1929.

PAUL C. McKENDRICK.